US008979120B2

(12) United States Patent
Mann

(10) Patent No.: US 8,979,120 B2
(45) Date of Patent: Mar. 17, 2015

(54) METHODS AND DEVICES FOR RESTRAINING AIRBAGS

(71) Applicant: Raymond Eugene Mann, Fort Morgan, CO (US)

(72) Inventor: Raymond Eugene Mann, Fort Morgan, CO (US)

(73) Assignee: MannSaver LLC, Fort Morgan, CO (US)

(*) Notice: Subject to any disclaimer, the term of this patent is extended or adjusted under 35 U.S.C. 154(b) by 0 days.

(21) Appl. No.: 14/211,559

(22) Filed: Mar. 14, 2014

(65) Prior Publication Data

US 2014/0265282 A1 Sep. 18, 2014

Related U.S. Application Data

(60) Provisional application No. 61/799,234, filed on Mar. 15, 2013.

(51) Int. Cl.
*B60R 21/16* (2006.01)
(52) U.S. Cl.
USPC ........................................................ 280/731
(58) Field of Classification Search
CPC ...... B60R 21/16; B60R 21/26; B60R 21/231; B60R 21/233
USPC .............................. 280/731, 727, 750; 74/558
See application file for complete search history.

(56) References Cited

U.S. PATENT DOCUMENTS

| | | | |
|---|---|---|---|
| 1,927,913 A | 9/1933 | Bennett | |
| 1,997,738 A * | 4/1935 | Maxedon et al. | 74/558.5 |
| 3,437,350 A | 4/1969 | Clark | |
| 3,982,602 A * | 9/1976 | Gorman | 280/727 |
| 5,131,290 A * | 7/1992 | Atkinson | 74/558.5 |
| 5,277,440 A | 1/1994 | Jackson, Jr. | |
| 5,540,067 A * | 7/1996 | Kim | 70/209 |
| 6,203,055 B1 * | 3/2001 | Mouws | 280/727 |
| 6,701,759 B2 * | 3/2004 | Joffrey | 70/209 |
| 6,923,470 B1 * | 8/2005 | Burgess | 280/727 |
| 6,942,239 B2 * | 9/2005 | Burgess | 280/727 |
| 2002/0194946 A1 * | 12/2002 | Jackson | 74/558 |

* cited by examiner

*Primary Examiner* — Faye M. Fleming
(74) *Attorney, Agent, or Firm* — Sheridan Ross P.C.

(57) ABSTRACT

Devices for restraining deploying airbags are disclosed, along with methods for using, making and refurbishing such devices. The devices and methods are designed to improve the safety of individuals in the vicinity of undeployed airbags, in particular, when there is a chance that the airbag may deploy unexpectedly. Unexpected airbag deployment can occur when the airbag deployment system is compromised, for example, by an accident such as an automobile collision.

20 Claims, 7 Drawing Sheets

METHODS AND DEVICES FOR RESTRAINING AIRBAGS

CROSS REFERENCE TO RELATED APPLICATION

This application claims the benefit of U.S. Provisional Patent Application No. 61/799,234 entitled "Methods and Devices for Restraining Airbags" filed Mar. 15, 2013, the entire disclosure of which is incorporated by reference herein.

FIELD OF THE INVENTION

The invention is useful in the field of safety devices, and in particular, in the field of safety devices useful in assisting first responders and others dealing with vehicles, such as automobiles, involved in collisions.

BACKGROUND OF THE INVENTION

Airbags are an important safety device used in vehicles such as automobiles. They are designed to deploy in the event of a collision in order to protect occupants of the vehicle. However, they can also present hazards.

Airbags can present a hazard, for example, after a collision. In particular, an undeployed or under-deployed airbag can deploy at an inopportune time and cause injury or other damage. For example, during a rescue attempt, if the airbag deploys while a rescuer or other individual is in the field of deployment, the airbag can injure the person. There has been at least one instance where an airbag deployed during a rescue attempt and injured both a first responder and an occupant of the vehicle.

As a result of this potential danger, first responders have developed protocols for dealing with the potential undesired deployment of airbags. In particular, first responders are typically advised to disconnect the battery in order to reduce the chance of undesired airbag deployment. However, airbags can still deploy, even after the battery has been disconnected. This deployment can take place from a few seconds to up to 30 minutes or more after the battery has been disconnected, depending on the model of the airbag. Therefore, first responders also typically wait for at least a few minutes after the battery has been disconnected before placing themselves or others within the field of deployment of undeployed airbags.

Delays in rescuing vehicle occupants can be dangerous. For example, an occupant may be injured, or the vehicle may be in danger of catching on fire or already be burning. In situations where time is of the essence, delays caused by disconnecting a battery and waiting after the battery has been disconnected can lead to injury and death. In addition, it may be impractical to disconnect the battery, depending on the damage to the vehicle or its proximity to other objects that may block access to the battery.

There are other situations where deployment of an airbag can be dangerous or undesirable. For example, when a mechanic works in the vicinity of an airbag, the mechanic may be in danger of injury, in particular, if the vehicle has been damaged or the airbag deployment system has been compromised.

Therefore, it would be useful to reduce the danger from undeployed airbags.

It would be useful to reduce the danger from undeployed airbags in a manner that is simple.

It would be useful to reduce the danger from undeployed airbags in a manner that is easy to accomplish.

It would be useful to reduce the danger from undeployed airbags in a manner that is quick.

It would be useful to reduce the danger from undeployed airbags in a manner that is inexpensive.

SUMMARY OF THE INVENTION

An embodiment of the present invention can be used as a personal protective device to protect first responders such as fire fighters, police officers and emergency medical technicians from injury or death while caring for and extracting individuals in vehicles.

An embodiment of the present invention is an airbag restraint system used to contain an airbag in the event of a delayed airbag deployment due to the integrity of an airbag system being compromised or altered, for example, due to an automobile collision.

An embodiment of the present invention can be used as a protective device at accident scenes to protect the vehicle occupant from an undeployed driver side airbag in the event an automobile collision is encountered. Use of the present invention will reduce the chance of or prevent further injury or death to a rescuer or vehicle occupant in the event of a delayed deployment of the driver side airbag.

An embodiment of the present invention can be quickly and easily installed from several angles so as to keep individuals outside the danger zone in the event of a delayed airbag deployment.

Methods of making, refurbishing and using the present invention are also disclosed.

In one embodiment of the present invention, a product for restraining an airbag is provided that includes material for covering an area towards which an airbag is designed to deploy and a device for holding said material in place, wherein the device is capable of restraining a deploying airbag.

In an embodiment of the present invention, an airbag restraining device is provided including a flexible material for covering an airbag mounted on a steering wheel and a device for removably anchoring the flexible material for covering an airbag to the steering wheel.

In an embodiment of the present invention, an airbag restraining device, is provided including a flexible material in at least an approximately circular shape for covering an airbag mounted on a steering wheel, wherein the flexible material is capable of covering the front, outer circumference, and part of the back of a steering wheel and a device for removably anchoring the flexible material to the steering wheel by covering the front and outer circumference of the steering wheel with the flexible material, and allowing the outer circumference of the flexible material to be pulled tightly in an approximately circular shape smaller than the outer circumference of the steering wheel in a position behind the steering wheel.

In an embodiment of the present invention, an airbag restraining device is provided including a flexible material in at least an approximately circular shape and a diameter of from about 15 to about 40 inches for covering an airbag mounted on a steering wheel, wherein the flexible material is capable of covering the front, outer circumference, and part of the back of a steering wheel, and a device for removably anchoring the flexible material to the steering wheel by covering the front and outer circumference of the steering wheel with the flexible material, and allowing the outer circumference of the flexible material to be pulled tightly inward toward a steering column to form a shape smaller than the outer circumference of the steering wheel in a position behind the steering wheel using a rope-like device in a sleeve formed around the outer circumference of the flexible material which can be drawn tight and anchored to hold the flexible material tightly in place, such that said flexible material is capable of restraining a deploying airbag.

In an embodiment of the present invention, a process for restraining an airbag is provided including the steps of covering with a material an area in which an airbag is designed to deploy, and removably attaching the material in place.

In an embodiment of the present invention, a process for manufacturing an airbag restraining device is provided, including the steps of preparing a covering material and providing the covering material with a device for removably positioning the covering material over an airbag.

In an embodiment of the present invention, a process for refurbishing an airbag restraining device including the steps of inspecting the airbag restraining device, identifying components which may fail, and replacing the components that may fail.

In an embodiment of the present invention, a process for installing an airbag restraining device including the steps of placing a flexible material over an airbag mounted on a steering wheel, covering the circumference of a steering wheel with a flexible material, removably anchoring the flexible material for covering an airbag and the flexible material for covering the circumference of the steering wheel to the steering well.

In an embodiment of the present invention, a process for installing an airbag restraining device is provided including the steps of placing a flexible material having at least an approximately circular shape in front of an airbag mounted on a steering wheel, wherein the flexible material is capable of covering the front, outer circumference, and part of the back of a steering wheel, and removably anchoring the flexible material to the steering wheel by covering the front and outer circumference of the steering wheel with the flexible material, and pulling the outer circumference of the flexible material tightly in an approximately circular shape smaller than the outer circumference of the steering wheel in a position behind the steering wheel.

In an embodiment of the present invention, a process for installing an airbag restraining device, including the steps of placing a flexible material having at least an approximately circular shape and a diameter of from about 15 to about 40 inches in front of an airbag mounted on a steering wheel, wherein the flexible material covers the front, outer circumference, and part of the back of a steering wheel, and removably anchoring the flexible material to the steering wheel by covering the front and outer circumference of the steering wheel with the flexible material, and allowing the outer circumference of the flexible material to be pulled tightly inward toward a steering column to form a shape smaller than the outer circumference of the steering wheel in a position behind the steering wheel by cinching a rope-like device in a sleeve formed around the outer circumference of the flexible material and drawing the rope tight to hold the flexible material tightly in place, such that said flexible material is capable of restraining a deploying airbag.

In an embodiment of the present invention, the material for covering an area comprises flexible material, for example cloth. The cloth can include materials selected from the group consisting of natural fibers, metal, polymer, and mixtures thereof. The material for covering an area can include ballistic material. The material for covering an area can include a material selected from the group consisting of Cordura, Kevlar, canvas, nylon, webbing, impregnated fiber materials, polymeric materials or combinations thereof.

The material for covering an area can be a rigid member, such as a panel. The rigid material can include materials selected from the group consisting of natural materials, metal, polymer, and mixtures thereof. The material for covering an area can include ballistic material. The material for covering an area can include a material selected from the group consisting of Cordura, Kevlar, canvas, nylon, webbing, impregnated fiber materials, polymeric materials or combinations thereof.

In an embodiment of the invention the material for covering an area can withstand a force of at least 150%, 200%, 250%, 300%, 350%, 400%, 450%, 500%, 550%, 600%, 650%, 700%, 750%, 800%, 850%, 900%, 950%, or 1000% of the force exerted by a deploying airbag.

In an embodiment of the invention, the material for covering an area is a size and shape to cover at least the area of deployment of an airbag.

DETAILED DESCRIPTION OF THE INVENTION

Figure 1:
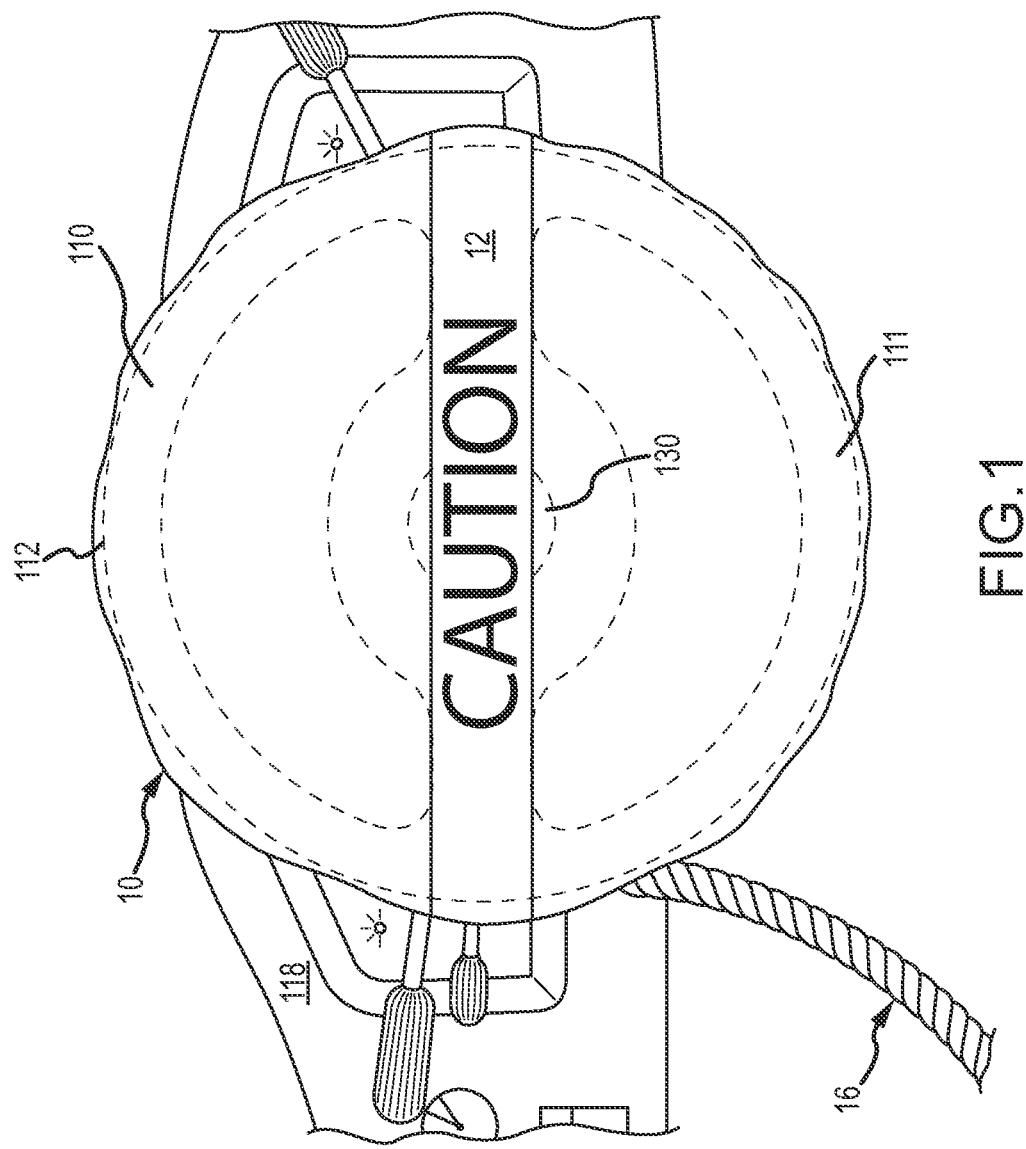
FIG. 1 illustrates a front view of an embodiment of the device of the present invention installed over an automobile steering wheel.

The present invention includes devices for restraining airbags, for example, airbags in vehicles such as automobiles. Methods for making such devices, using such devices, inspecting such devices and refurbishing such devices are also included within the scope of the present invention.

Embodiments of the present invention will be described mainly in connection with steering wheel mounted airbags. However, the present invention is not limited to use with steering wheel mounted airbags, and can be used in connection with other airbags, for example, dashboard mounted airbags, column mounted airbags, curtain airbags, seat mounted airbags, headrest mounted airbags, etc.

As used herein, terms such as restrain, restraint, restrains, restrained and restraining, and variations thereof, when used in connection with airbags, mean to limit the volume and/or direction of expansion of the airbag to a volume that is less than the volume to which and/or a direction that is different from the direction toward which, the airbag was designed to be deployed. For example, the devices and methods of the present invention may be used to prevent an airbag from expanding to its full volume when deployed. This can be accomplished by restricting the airbag within an envelope when the airbag is deployed. For example, with a steering wheel mounted airbag, the present invention can be employed to limit the airbag from expanding more than 12, 11, 10, 9, 8, 7, 6, 5, 4, 3, 2, or 1 inch(es) towards where a driver is normally positioned. The devices can expand slightly to absorb the force of the deploying airbag. Alternatively, the devices can be designed to absorb the force of the deploying airbag without expanding at all. The devices and methods of the present invention can be used to redirect the force of the deploying airbag in a direction away from where an occupant of a vehicle is normally located. For example, with a steering wheel mounted airbag, the devices and methods of the present invention can direct the deploying airbag towards the dashboard and away from the area where the driver is typically located. The device and method of the present invention can also do both, limit the expansion of the deploying airbag and redirect the direction of the force of the deploying airbag.

In one embodiment, the devices of the present invention can be installed over a vehicle steering wheel, covering the front of the steering wheel entirely, and with an opening of the device oriented toward a dashboard. As used herein, the front of the steering wheel will refer to that side of the steering wheel that faces away from a dashboard, in other words, towards where a driver of a vehicle is normally seated. The back of the steering wheel will refer to the side of the steering wheel facing the dashboard, in other words, away from where a driver of a vehicle is normally seated. The top of a steering wheel will refer to that portion nearest the top or roof of the vehicle, and the bottom of the steering will refer to that portion towards the ground or the floor of the vehicle.

Figure 2:
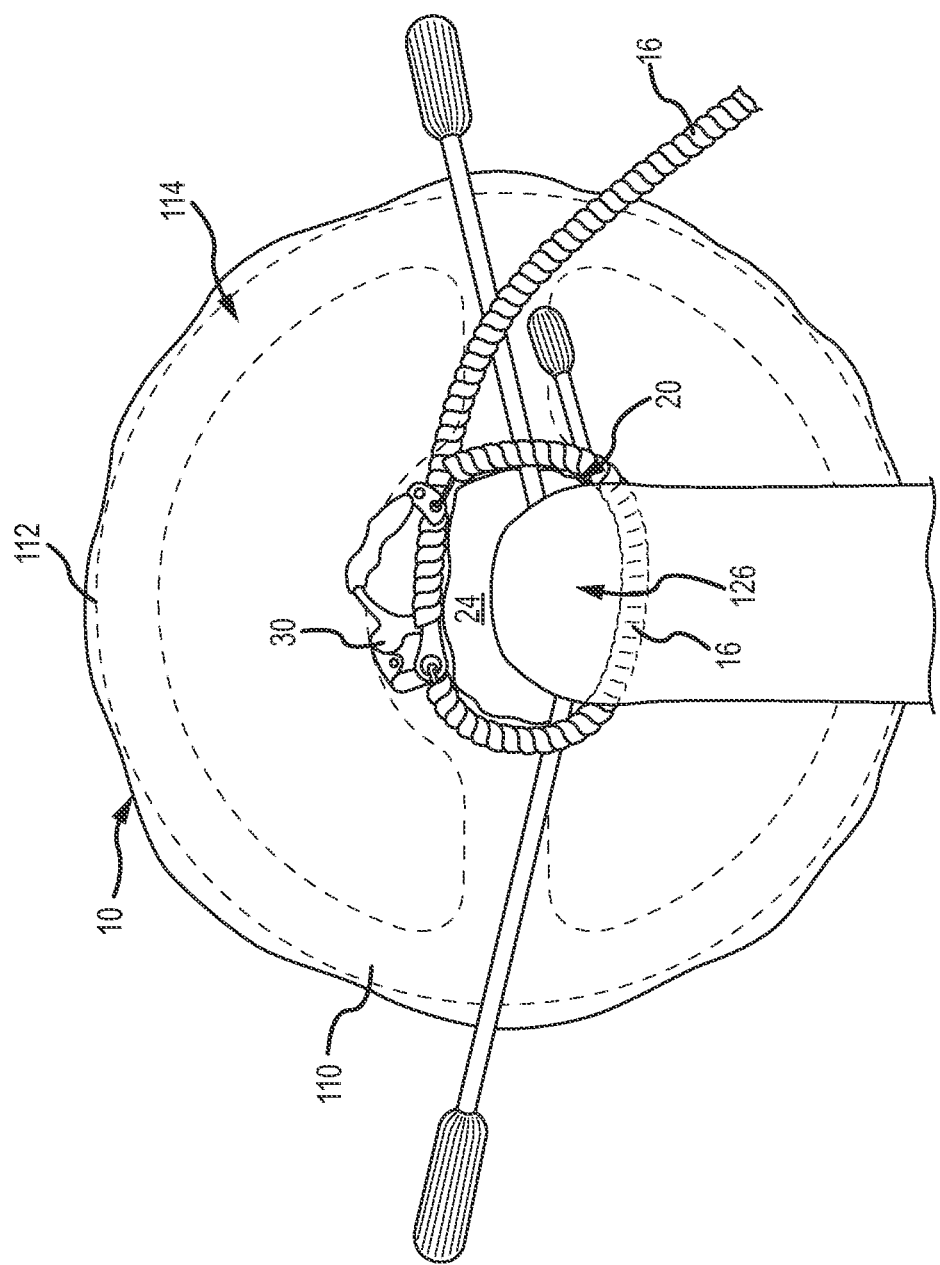
FIG. 2 illustrates a back view of an embodiment of the device of the present invention installed over an automobile steering wheel.
Figure 3:
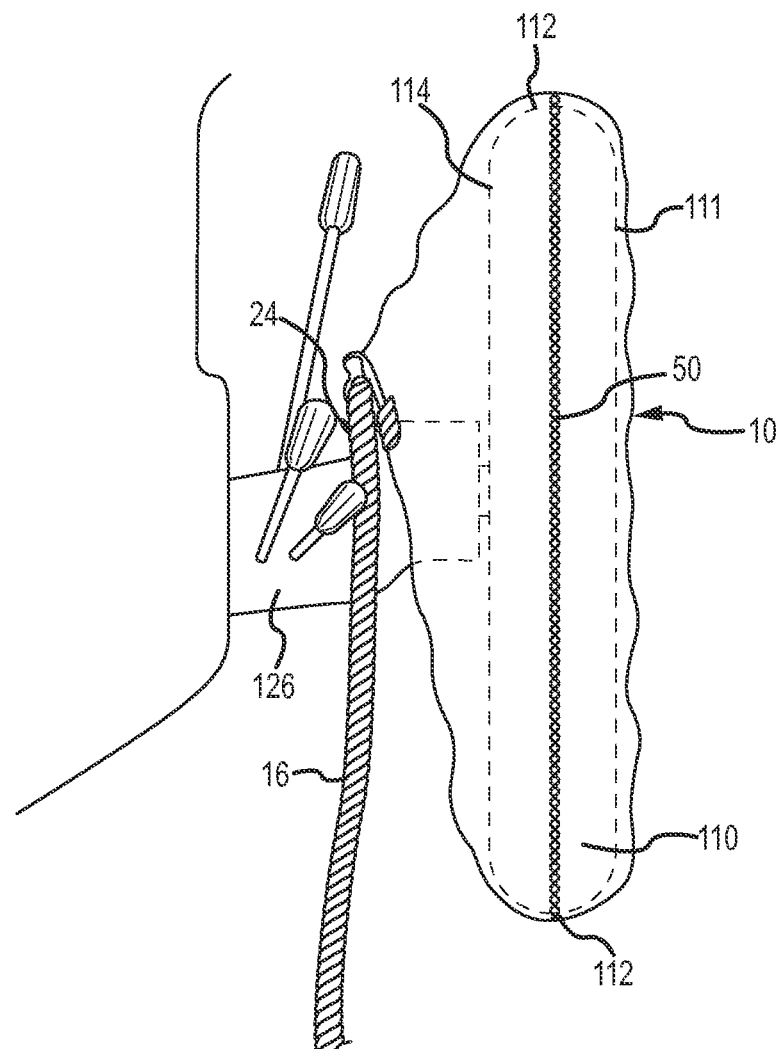
FIG. 3 illustrates a side view of an embodiment of the device of the present invention installed over an automobile steering wheel.
Figure 4:
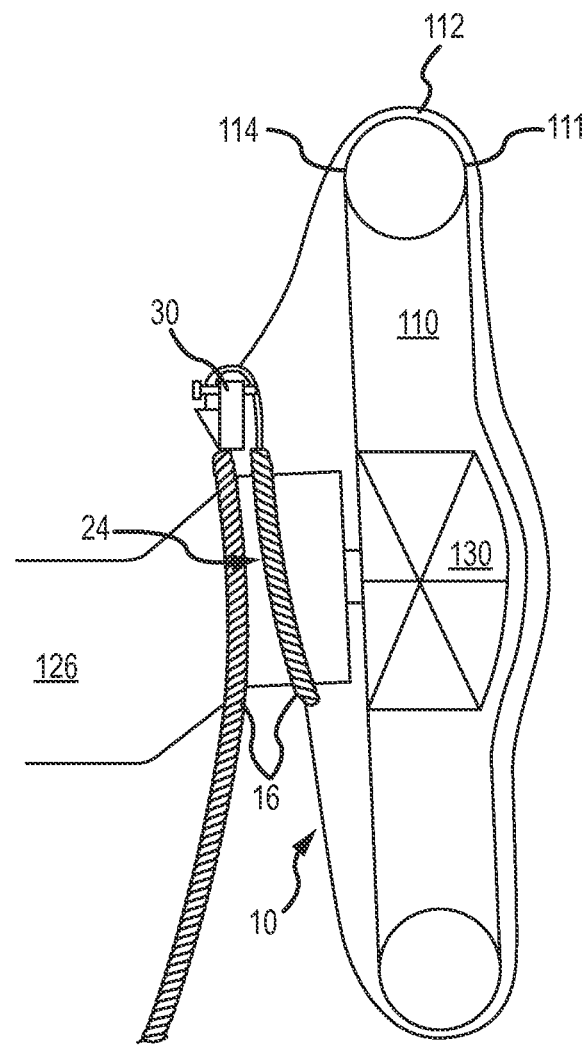
FIG. 4 illustrates a side cutaway view of an embodiment of the device of the present invention installed over an automobile steering wheel.
Figure 5:
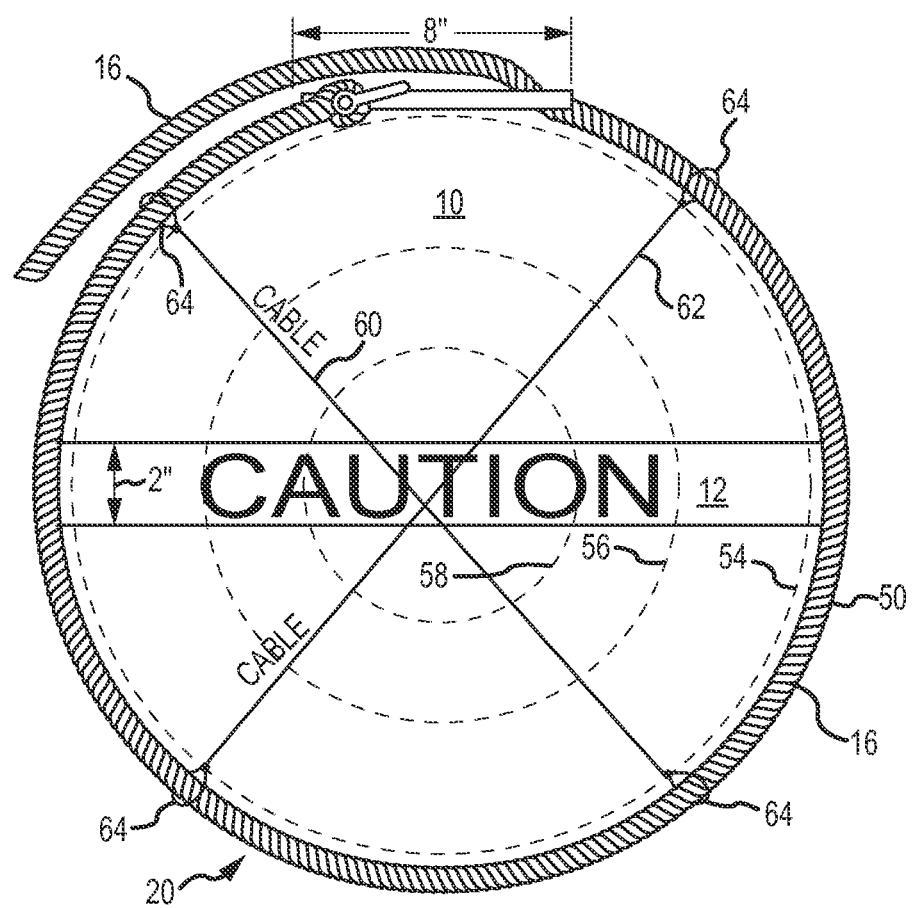
FIG. 5 illustrates a front view of an embodiment of the device of the present invention with the cover material shown as transparent to illustrate the internal components.

In the attached drawings, the same number is used to indicate the same item in the various figures. FIG. 1 illustrates a front view of one embodiment of the device of the present invention 10. The device 10 is installed over a steering wheel 110, which is shown by dotted lines because it is covered by the device 10. The device 10 is designed to cover the front 111 of the steering wheel 110, the outer circumference 112 of the steering wheel 110, and part of the back 114 of the steering wheel 110. The back 114 of the steering wheel 110 cannot be seen in FIG. 1, but is illustrated in FIGS. 2, 3 and 4. An optional "CAUTION" strap 12 is illustrated in FIGS. 1 and 5.

The device 10 is secured to the steering wheel 110 with a longitudinal securing object, such as a rope 16 by placing the outer circumference 20 (see FIGS. 2, 5 and 6) of the device 10 behind the back 114 of the steering wheel 110 in other words towards the dashboard 118. The outer circumference 20 is then tightened to form a small, approximately round, opening 24 at the back of the steering wheel 110 around the steering column 126 (see FIGS. 2, 3 and 4). It is not necessary that the opening 24 contact the steering column 126. In this way the device 10 is tight and forms a taut envelope. The front 111 of the steering wheel 110 is completely covered by the device 10, as are the outer circumference 112 of the steering wheel 110 and the outer portion of the back 114 of the steering wheel 110. In this way, if the airbag (which is contained in a compartment 130 in the center of the steering wheel 110) were to deploy, it would be restrained within the envelope formed by the device 10 and/or it would be redirected through the opening 24 of the device 10 located around the steering column 126 towards the back 114 of the steering wheel 110 and towards the dashboard 118.

In one embodiment, the device 10 is tightened by tightening a rope 16 contained within the outer circumference 20 of the device. The device 10 can include a rope holding device such as a Petzl Rope Grab System 30 (e.g., model #CE0082 available from Petzl International, Crolles, France or similar rope locking devices, see FIGS. 2 and 4). In order to operate such a system, one slides the Petzl Rope Grab System 30 toward the steering column 126 while simultaneously pulling rope 16 through the Petzl Rope Grab System 30 until the device 10 is firmly and tightly installed around the steering wheel 110. All rope slack should be pulled through the Petzl Rope Grab System 30, by pulling the loose end of the rope 16 away from steering column 126. To remove the device 10, unlock the Petzl Rope Grab System 30 by moving a trigger mechanism away from rope 16. This will release the "jaws" of the Petzl Rope Grab System 30 away from the rope 16. The Petzl Rope Grab System 30 can then be pulled away from the steering column 126 while simultaneously pulling the rope 16 between the steering column 126 and the Petzl Rope Grab System 30 toward the steering column 126. In this way, ample rope slack is achieved to allow removal of the device of the present invention. As will be appreciated, securing systems other than the Petzl Rope Grab System 30 can be employed in the present invention. The important requirement is that the securing object holds the device of the present invention firmly and tightly in place.

In alternative embodiments, objects other than ropes can be used to tighten the device of the present invention. For example, wires and other strong, flexible, longitudinal objects can be used. Self locking longitudinal objects such as Zip ties, straps, zippers, buckles, belts, and other similar objects can be used. The important requirement is that the device be held firmly and tightly in place, and that it be able to effectively restrain the airbag in the event of deployment.

Although the present description is directed to installation on a steering column, the devices and methods of the present invention can be used to restrain airbags installed in locations in the vehicle other than the steering column. In these alternative embodiments, the device is placed over the front of the airbag compartment and secured in place. Fasteners such as screws, bolts, clamps, spikes, hooks, Zip ties, suction cups, ropes, wires, straps, etc. can be used to secure the devices of the present invention in place, whether on a steering wheel or otherwise. The devices reduce the risk of injury by restraining the deployment of the covered airbag. As used herein, the front of the airbag compartment refers to the side of the airbag compartment towards which the airbag is designed to deploy.

If an airbag is deployed within the device of the present invention, the device can be destroyed and disposed of to prevent reuse. Alternatively, the device of the present invention can be inspected and refurbished, by replacing any damaged components of the device. Preferably, the device is returned to the manufacturer for refurbishment in order to ensure that it can be safely reused.

In a preferred embodiment, the device of the present invention is assembled by cutting 2 pieces of material to the proper dimensions. Preferably, the material is shaped for the specific application intended. For example, for devices designed to go over steering wheels, the material is cut to approximate a circle about 15, 16, 17, 18, 19, 20, 21, 22, 23, 24, 25, 26, 27, 28, 29, 30, 31, 32, 33, 34, 35, 36, 37, 38, 39, or 40 inches in diameter, or about 20-40, 21-30, 23-29, or 25-28 inches in diameter. The size of the device will be determined on the desired applications. For example, about 27 inches in diameter for a standard steering wheel, but it can be larger or smaller. Different size devices can be manufactured for different applications.

Figure 6:
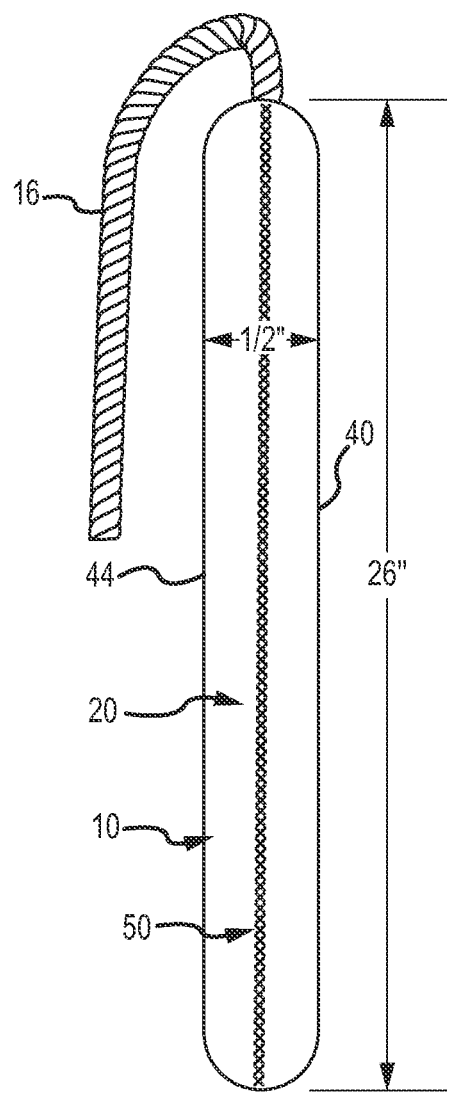
FIG. 6 illustrates a side view of an embodiment of the device of the present invention.
Figure 7:
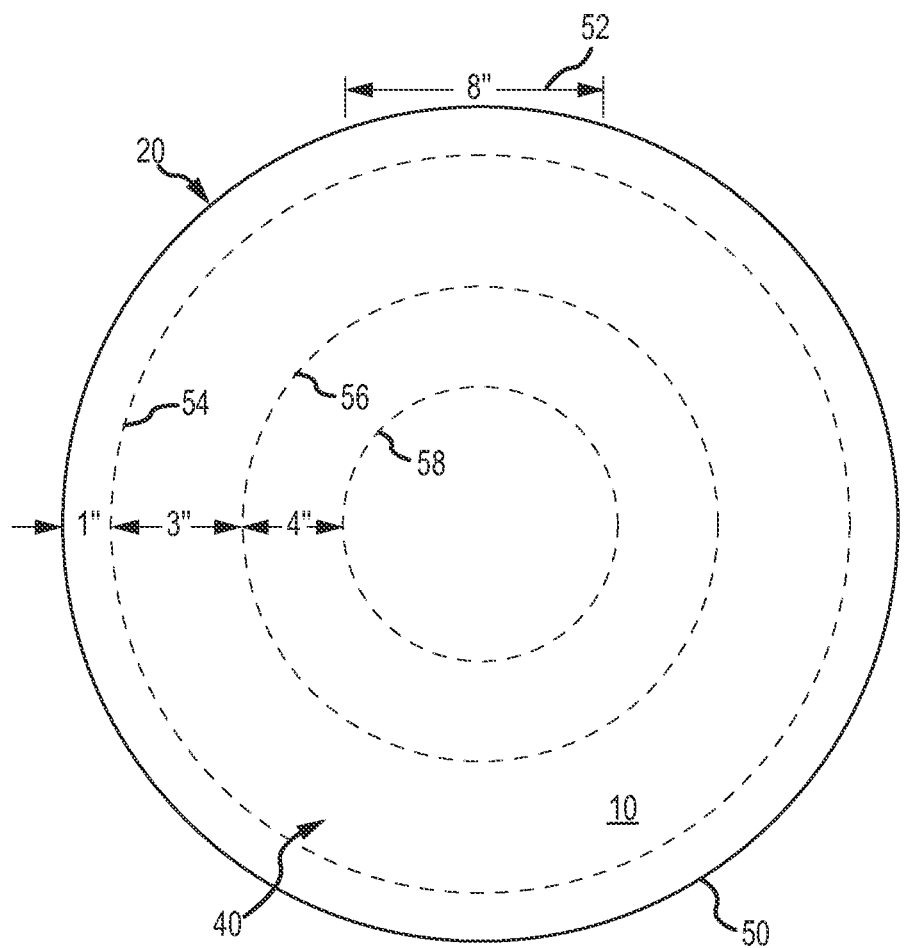
FIG. 7 illustrates stitching patterns on a front view of a cover material for an embodiment of the device of the present invention.

As illustrated in FIGS. 5, 6, and 7, in one embodiment the material for the front 40 of the device 10 is 1000 Denier Nylon Cordura fabric (available from DuPont, Wilmington, Del.). Preferably, the material for the back 44 of the device 10 is 400 Denier Nylon coated fabric. Alternative materials can be used such as cloth-like materials made from natural, man-made and/or metal fibers, for example, ballistic materials such as Kevlar (available from DuPont, Wilmington, Del.), webbing, canvas, impregnated fiber materials, or polymeric materials.

Although flexible materials are preferred for use in the present invention, rigid materials such as boards and panels made from natural materials (e.g., wood), metals (e.g., aluminum, steel, titanium) and polymeric materials can be used to cover the front of the airbag. Preferably, a space is left in which the airbag can partially deploy. Rigid material should be strong and resistant to fracturing or shattering.

It is important that the flexible or rigid material be able to withstand the force of a deploying airbag. Because different airbags deploy with different forces, it is best to design the device to withstand the force of the most powerful airbag that the device is intended to restrain, and include a margin of safety. The margin of safety can be at least about 150%, 200%, 250%, 300%, 350%, 400%, 450%, 500%, 600%, 700%, 800%, 900%, or 1000% of the force of the deploying airbag that the device is intended to restrain.

In an embodiment, the color of the front piece 40 is different from the color of the back piece 44 in order to assist in the correct installation of the device during use. For example, the front piece 40 can be bright orange, and the back piece 44 can be black, to aid the installer during a rescue attempt. The outer edge 20 of the two circular materials are sewn together with stitching 50 as shown in FIG. 3, leaving approximately 8 inches of outer circumference 52 that is not sewn in order to allow the materials to be turned inside out. The materials 40 and 44 are then turned inside out through this 8 inch void 52.

A rope 16 (such as ⅜"×4' Samson Bluestreak rope available from Samson, Ferndale, Wash., other types and sizes of ropes and other longitudinal binding objects can be used as long as they can tighten the device and have sufficient strength) is inserted through terminated loops 64 at the ends of two cables 60 and 62 (two 3/32" braided steel cable or similar components). The cables 60 and 62 will initially be longer than the diameter of the airbag restraining device, in order to allow the formation of loops 64 at both ends of the two cables. For example, when the finished airbag restraining device 10 has a 27 inch diameter, the cable can initially be 30" in length, with the final length about 27 inches after the loops are fashioned at the ends of each cable, forming a total of four loops. The rope/cable system is inserted into fabric. Materials other than steel cable can be used. For example, other metal cables, straps, ropes, webbing, etc. can be employed, and more or less than 2 can be employed, e.g., 1, 2, 3, 4, 5, 6, 7, 8 or more cables, straps, ropes, webbing, etc. can be employed, preferably with loops at each end. Furthermore, the cables do not have to be employed if the other materials provide sufficient strength, including a safety factor. This is true of other materials included in the device.

Words can also be printed on the front and/or back to aid installation and to advise caution. For example, a strap 12 can be installed at center point of materials in a horizontal orientation. If desired, a 2" wide×27" long nylon strap 12; black in color can be placed horizontally over the bag. Additionally, bright thread (e.g., orange cotton) can be used to embroider a warning, such as "CAUTION," horizontally within the nylon strap 12.

The entire device 10 can be stitched 50, 54, 56 and/or 58 together, for example it can be stitched 56 in a circular pattern 4" from outer edge of material and stitched 54 in a circular pattern 1" from outer edge. Further stitching can be added along both sides or opposite sides of each cable (or webbing) stitching straight across the diameter, i.e., non-circular. This non-circular stitching reduces rope slippage when the device is used.

The Petzl Rope Grab System (Petzl Ascender #CE0082 or similar) is installed on the rope with jaws (rope grabbing-mechanism) toward the device with the handle of the Petzl Rope Grab System furthest away from the device, more so, toward the end of the rope. A clevis & bolt (¼" Clevis and ½" bolt with nylon nut or similar) can be installed through the Petzl Rope Grab System so that the rope and Petzl orientation is correct.

Embodiments of the present invention are described in the following numbered paragraphs.

1. A product for restraining an airbag, comprising:
   a. material for covering an area towards which an airbag is designed to deploy; and
   b. a device for holding said material in place, wherein the device is capable of restraining a deploying airbag.

2. An airbag restraining device, comprising:
   a. a flexible material for covering an airbag mounted on a steering wheel; and
   b. a device for removably anchoring the flexible material for covering an airbag to the steering wheel.

3. An airbag restraining device, comprising:
   a. a flexible material in at least an approximately circular shape for covering an airbag mounted on a steering wheel, wherein the flexible material is capable of covering the front, outer circumference, and part of the back of a steering wheel; and
   b. a device for removably anchoring the flexible material to the steering wheel by covering the front and outer circumference of the steering wheel with the flexible material, and allowing the outer circumference of the flexible material to be pulled tightly in an approximately circular shape smaller than the outer circumference of the steering wheel in a position behind the steering wheel.

4. An airbag restraining device, comprising:
   a. a flexible material in at least an approximately circular shape and a diameter of from about 15 to about 40 inches for covering an airbag mounted on a steering wheel, wherein the flexible material is capable of covering the front, outer circumference, and part of the back of a steering wheel; and
   b. a device for removably anchoring the flexible material to the steering wheel by covering the front and outer circumference of the steering wheel with the flexible material, and allowing the outer circumference of the flexible material to be pulled tightly inward toward a steering column to form a shape smaller than the outer circumference of the steering wheel in a position behind the steering wheel using a rope-like device in a sleeve formed around the outer circumference of the flexible material which can be drawn tight and anchored to hold the flexible material tightly in place, such that said flexible material is capable of restraining a deploying airbag.

5. The product of any preceding numbered paragraph, wherein the material for covering an area comprises flexible material.

6. The product of any preceding numbered paragraph, wherein the material for covering an area comprises cloth.

7. The product of any preceding numbered paragraph, wherein the material for covering an area comprises cloth comprising natural fibers.

8. The product of any preceding numbered paragraph, wherein the material for covering an area comprises cloth comprising man-made fibers.

9. The product of any preceding numbered paragraph, wherein the material for covering an area comprises cloth comprising polymer.

10. The product of any preceding numbered paragraph, wherein the material for covering an area comprises cloth comprising metal.

11. The product of any preceding numbered paragraph, wherein the material for covering an area comprises cloth comprising materials selected from the group consisting of natural fibers, metal, polymer, and mixtures thereof.

12. The product of any preceding numbered paragraph, wherein the material for covering an area comprises cloth comprising ballistic material.

13. The product of any preceding numbered paragraph, wherein the material for covering an area comprises a material selected from the group consisting of Cordura, Kevlar, canvas, nylon, webbing, impregnated fiber materials, polymeric materials or combinations thereof.

14. The product of any preceding numbered paragraph, wherein the material for covering an area is rigid.

15. The product of any preceding numbered paragraph, wherein the material for covering an area comprises a panel.

16. The product of any preceding numbered paragraph, wherein the material for covering an area comprises a panel comprising natural material.

17. The product of any preceding numbered paragraph, wherein the material for covering an area comprises a panel comprising man-made material.

18. The product of any preceding numbered paragraph, wherein the material for covering an area comprises a panel comprising polymer.

19. The product of any preceding numbered paragraph, wherein the material for covering an area comprises a panel comprising metal.

20. The product of any preceding numbered paragraph, wherein the material for covering an area comprises a panel comprising materials selected from the group consisting of natural fibers, metal, polymer, and mixtures thereof.

21. The product of any preceding numbered paragraph, wherein the material for covering an area comprises a panel comprising materials selected from the group consisting of wood, metal, polymer, and mixtures thereof.

22. The product of any preceding numbered paragraph, wherein the material for covering an area comprises a panel comprising ballistic material.

23. The product of any preceding numbered paragraph, wherein the material for covering an area comprises a panel comprising material selected from the group consisting of Cordura, Kevlar, canvas, nylon, webbing, impregnated fiber materials, polymeric materials or combinations thereof.

24. The product of any preceding numbered paragraph, wherein the material for covering an area can withstand the force of at least 150% of the force exerted by a deploying airbag.

25. The product of any preceding numbered paragraph, wherein the material for covering an area can withstand the force of at least 200% of the force exerted by a deploying airbag.

26. The product of any preceding numbered paragraph, wherein the material for covering an area can withstand the force of at least 250% of the force exerted by a deploying airbag.

27. The product of any preceding numbered paragraph, wherein the material for covering an area can withstand the force of at least 300% of the force exerted by a deploying airbag.

28. The product of any preceding numbered paragraph, wherein the material for covering an area can withstand the force of at least 400% of the force exerted by a deploying airbag.

29. The product of any preceding numbered paragraph, wherein the material for covering an area can withstand the force of at least 500% of the force exerted by a deploying airbag.

30. The product of any preceding numbered paragraph, wherein the material for covering an area can withstand the force of at least 1000% of the force exerted by a deploying airbag.

31. The product of any preceding numbered paragraph, wherein the material for covering an area is a size and shape to cover at least the area of deployment of an airbag.

32. A process for restraining an airbag, comprising:
   a. covering with a material an area in which an airbag is designed to deploy, and
   b. removably attaching the material in place.

33. The process of any preceding numbered process paragraph, wherein said material is impact-resistant.

34. The process of any preceding numbered process paragraph, wherein said material comprises a flexible material.

35. The process of any preceding numbered process paragraph, wherein said material comprises a rigid material.

36. The process of any preceding numbered process paragraph, wherein said material is capable of restraining a deploying airbag.

37. The process of any preceding numbered process paragraph, wherein the step of removably attaching the material comprises removably attaching the material to a stable member in the vicinity of the airbag.

38. A process for manufacturing an airbag restraining device, comprising:
   a. preparing a covering material; and
   b. providing the covering material with a device for removably positioning the covering material over an airbag.

39. A process for refurbishing an airbag restraining device, comprising:
   a. inspecting the airbag restraining device;
   b. identifying components which may fail; and
   c. replacing the components that may fail.

40. A process for installing an airbag restraining device, comprising:
   a. placing a flexible material over an airbag mounted on a steering wheel;
   b. covering the circumference of a steering wheel with a flexible material; and
   c. removably anchoring the flexible material for covering an airbag and the flexible material for covering the circumference of the steering wheel to the steering well.

41. A process for installing an airbag restraining device, comprising:
   a. placing a flexible material having at least an approximately circular shape in front of an airbag mounted on a steering wheel, wherein the flexible material is capable of covering the front, outer circumference, and part of the back of a steering wheel; and
   b. removably anchoring the flexible material to the steering wheel by covering the front and outer circumference of the steering wheel with the flexible material, and pulling the outer circumference of the flexible material tightly in an approximately circular shape smaller than the outer circumference of the steering wheel in a position behind the steering wheel.

42. A process for installing an airbag restraining device, comprising:
   a. placing a flexible material having at least an approximately circular shape and a diameter of from about 15 to about 40 inches in front of an airbag mounted on a steering wheel, wherein the flexible material covers the front, outer circumference, and part of the back of a steering wheel; and b. removably anchoring the flexible material to the steering wheel by covering the front and outer circumference of the steering wheel with the flexible material, and allowing the outer circumference of the flexible material to be pulled tightly inward toward a steering column to form a shape smaller than the outer circumference of the steering wheel in a position behind the steering wheel by cinching a rope-like device in a sleeve formed around the outer circumference of the flexible material and drawing the rope tight to hold the flexible material tightly in place, such that said flexible material is capable of restraining a deploying airbag.

43. The process of any preceding numbered process paragraph, wherein the material for covering an area comprises flexible material.

44. The process of any preceding numbered process paragraph, wherein the material for covering an area comprises cloth.

45. The process of any preceding numbered process paragraph, wherein the material for covering an area comprises cloth comprising natural fibers.

46. The process of any preceding numbered process paragraph, wherein the material for covering an area comprises cloth comprising man-made fibers.

47. The process of any preceding numbered process paragraph, wherein the material for covering an area comprises cloth comprising polymer.

48. The process of any preceding numbered process paragraph, wherein the material for covering an area comprises cloth comprising metal.

49. The process of any preceding numbered process paragraph, wherein the material for covering an area comprises cloth comprising materials selected from the group consisting of natural fibers, metal, polymer, and mixtures thereof.

50. The process of any preceding numbered process paragraph, wherein the material for covering an area comprises cloth comprising ballistic material.

51. The process of any preceding numbered process paragraph, wherein the material for covering an area comprises a material selected from the group consisting of Cordura, Kevlar, canvas, nylon, webbing, impregnated fiber materials, polymeric materials or combinations thereof.

52. The process of any preceding numbered process paragraph, wherein the material for covering an area is rigid.

53. The process of any preceding numbered process paragraph, wherein the material for covering an area comprises a panel.

54. The process of any preceding numbered process paragraph, wherein the material for covering an area comprises a panel comprising natural material.

55. The process of any preceding numbered process paragraph, wherein the material for covering an area comprises a panel comprising man-made material.

56. The process of any preceding numbered process paragraph, wherein the material for covering an area comprises a panel comprising polymer.

57. The process of any preceding numbered process paragraph, wherein the material for covering an area comprises a panel comprising metal.

58. The process of any preceding numbered process paragraph, wherein the material for covering an area comprises a panel comprising materials selected from the group consisting of natural fibers, metal, polymer, and mixtures thereof.

59. The process of any preceding numbered process paragraph, wherein the material for covering an area comprises a panel comprising materials selected from the group consisting of wood, metal, polymer, and mixtures thereof.

60. The process of any preceding numbered process paragraph, wherein the material for covering an area comprises a panel comprising ballistic material.

61. The process of any preceding numbered process paragraph, wherein the material for covering an area comprises a panel comprising material selected from the group consisting of Cordura, Kevlar, canvas, nylon, webbing, impregnated fiber materials, polymeric materials or combinations thereof.

62. The process of any preceding numbered process paragraph, wherein the material for covering an area can withstand the force of at least 150% of the force exerted by a deploying airbag.

63. The process of any preceding numbered process paragraph, wherein the material for covering an area can withstand the force of at least 200% of the force exerted by a deploying airbag.

64. The process of any preceding numbered process paragraph, wherein the material for covering an area can withstand the force of at least 250% of the force exerted by a deploying airbag.

65. The process of any preceding numbered process paragraph, wherein the material for covering an area can withstand the force of at least 300% of the force exerted by a deploying airbag.

66. The process of any preceding numbered process paragraph, wherein the material for covering an area can withstand the force of at least 400% of the force exerted by a deploying airbag.

67. The process of any preceding numbered process paragraph, wherein the material for covering an area can withstand the force of at least 500% of the force exerted by a deploying airbag.

68. The process of any preceding numbered process paragraph, wherein the material for covering an area can withstand the force of at least 1000% of the force exerted by a deploying airbag.

69. The process of any preceding numbered process paragraph, wherein the material for covering an area is a size and shape to cover at least the area of deployment of an airbag.

The present invention is not limited to the above-described embodiments, and any other modifications and improvements may be applied within the scope and spirit of the present invention. For example, alternative materials may be used in the present invention. The various teachings of the present invention can be combined in combinations other than the ones explicitly disclosed.

What is claimed is:

1. A product for restraining an airbag, comprising:
a flexible material for covering an area towards which an airbag is designed to deploy, said flexible material provided in at least an approximately circular shape and a diameter of from about 15 to about 40 inches for covering an airbag mounted on a steering wheel, wherein the flexible material is capable of covering the front, outer circumference, and part of the back of a steering wheel, said flexible material comprising an outer circumference and a rope contained within said outer circumference, said rope adapted to secure the product to the steering wheel;
a rope holding and locking means selectively translatable along said rope, said rope holding and locking means comprising a trigger mechanism for unlocking said rope holding and locking means;

wherein said flexible material comprises a sleeve formed around said outer circumference of said flexible material and said rope is provided in said sleeve.

2. An airbag restraining device, comprising:
a. a flexible material in at least an approximately circular shape for covering an airbag mounted on a steering wheel, wherein the flexible material is capable of covering the front, outer circumference, and part of the back of a steering wheel, and comprises at least one of a circular stitch and a linear stitch extending across a diameter of said circular shape; and
b. a device for removably anchoring the flexible material to the steering wheel by covering the front and outer circumference of the steering wheel with the flexible material, and allowing the outer circumference of the flexible material to be pulled tightly in an approximately circular shape smaller than the outer circumference of the steering wheel in a position behind the steering wheel, said device comprising at least one of a rope and a cord, and a rope grabbing mechanism comprising a hand-grip portion and a trigger for releasing said at least one of a rope and a cord, said rope grabbing mechanism comprising a breaking strength of at least approximately 500 pounds.

3. An airbag restraining device, comprising:
a flexible material provided in an approximately circular shape and having a diameter of between about 15 to about 40 inches for covering an airbag mounted on a steering wheel, wherein the flexible material is capable of covering the front, outer circumference, and part of the back of a steering wheel; and
a device for removably anchoring the flexible material to the steering wheel by covering the front and outer circumference of the steering wheel with the flexible material, and allowing the outer circumference of the flexible material to be pulled tightly inward toward a steering column to form a shape smaller than the outer circumference of the steering wheel in a position behind the steering wheel using a rope-like device with a substantially circular cross-section provided in a sleeve formed around the outer circumference of the flexible material which can be drawn tight and anchored to hold the flexible material tightly in place, such that said flexible material is capable of restraining a deploying airbag, said device comprising a handle for grasping the device and a rope-grabbing mechanism to selectively secure the device at a specific position along a length of the rope.

4. The product of claim 1, wherein the flexible material for covering an area comprises cloth.

5. The product of claim 1, wherein the flexible material for covering an area comprises cloth comprising polymer.

6. The product of claim 1, wherein the flexible material for covering an area comprises cloth comprising metal.

7. The product of claim 1, wherein the flexible material for covering an area comprises cloth comprising materials selected from the group consisting of natural fibers, metal, polymer, and mixtures thereof.

8. The product of claim 1, wherein the flexible material for covering an area comprises cloth comprising ballistic material.

9. The product of claim 1, wherein the flexible material for covering an area comprises a material selected from the group consisting of Cordura, Kevlar, canvas, nylon, webbing, impregnated fiber materials, polymeric materials or combinations thereof.

10. The product of claim 1, wherein the flexible material for covering an area comprises a panel.

11. The product of claim 1, wherein the flexible material for covering an area comprises a panel comprising polymer.

12. The product of claim 1, wherein the flexible material for covering an area comprises a panel comprising metal.

13. The product of claim 1, wherein the flexible material for covering an area comprises a panel comprising materials selected from the group consisting of natural fibers, metal, polymer, and mixtures thereof.

14. The product of claim 1, wherein the flexible material for covering an area comprises a panel comprising materials selected from the group consisting of wood, metal, polymer, and mixtures thereof.

15. The product of claim 1, wherein the material for covering an area comprises a panel comprising ballistic material.

16. The product of claim 1, wherein the flexible material for covering an area comprises a plurality of panels comprising material selected from the group consisting of Cordura, Kevlar, canvas, nylon, webbing, impregnated fiber materials, polymeric materials or combinations thereof.

17. The product of claim 1, wherein the flexible material for covering an area can withstand the force of at least 150% of the force exerted by a deploying airbag.

18. The product of claim 1, wherein the flexible material for covering an area is a size and shape to cover at least the area of deployment of an airbag.

19. The device of claim 2, further comprising at least one of words and text printed on the front and/or back of the device to advise caution.

20. The device of claim 3, wherein a front of the device comprises a first color and a back of the device comprises a second color, said first color being different from said second color.

* * * * *